Feb. 2, 1943.     C. DOERING ET AL     2,310,067
MEAT REFORMING AND ROLLING MACHINE
Filed Oct. 1, 1938     3 Sheets-Sheet 1

INVENTORS.
CHARLES DOERING.
HENRY H. DOERING.
BERT J. SKOGLUND.
ERIC W. ANDERSON.
BY
ATTORNEY.

Feb. 2, 1943. C. DOERING ET AL 2,310,067
MEAT REFORMING AND ROLLING MACHINE
Filed Oct. 1, 1938 3 Sheets-Sheet 2
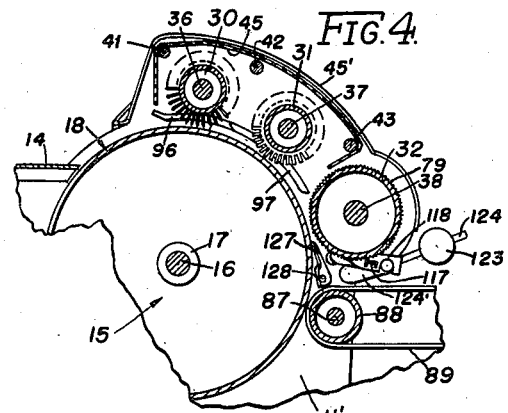
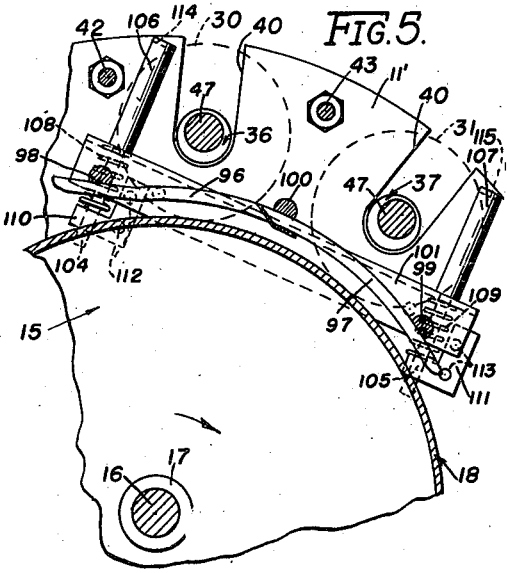
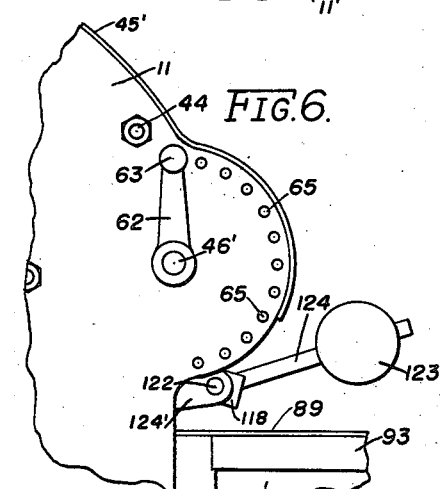
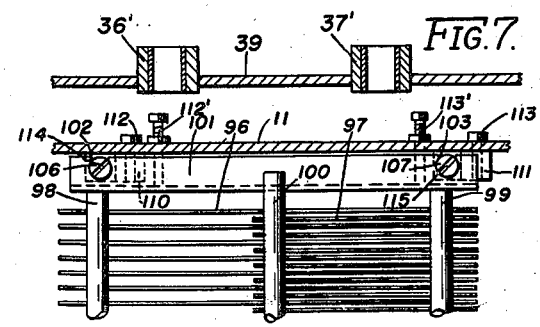
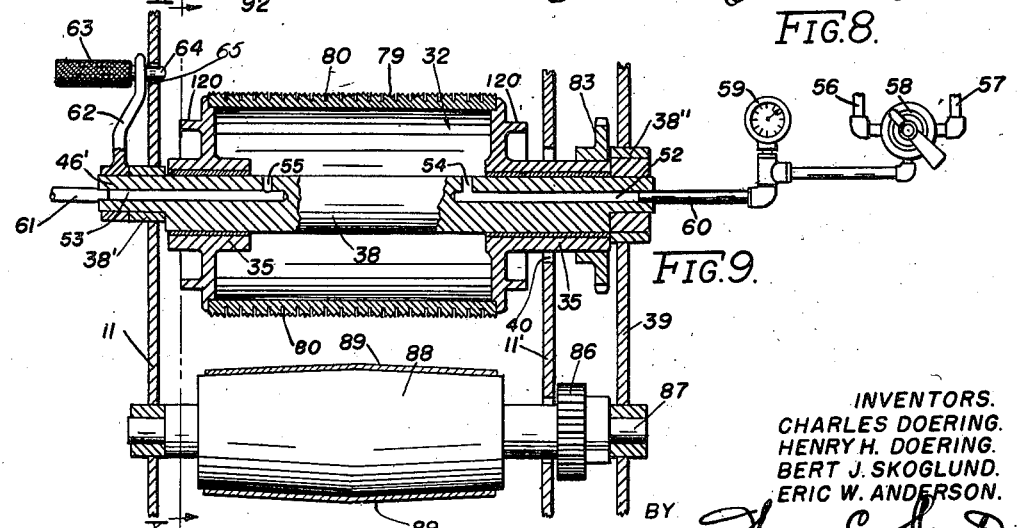
INVENTORS.
CHARLES DOERING.
HENRY H. DOERING.
BERT J. SKOGLUND.
ERIC W. ANDERSON.
BY
ATTORNEY Feb. 2, 1943.　　　C. DOERING ET AL　　　2,310,067
MEAT REFORMING AND ROLLING MACHINE
Filed Oct. 1, 1938　　　3 Sheets-Sheet 3
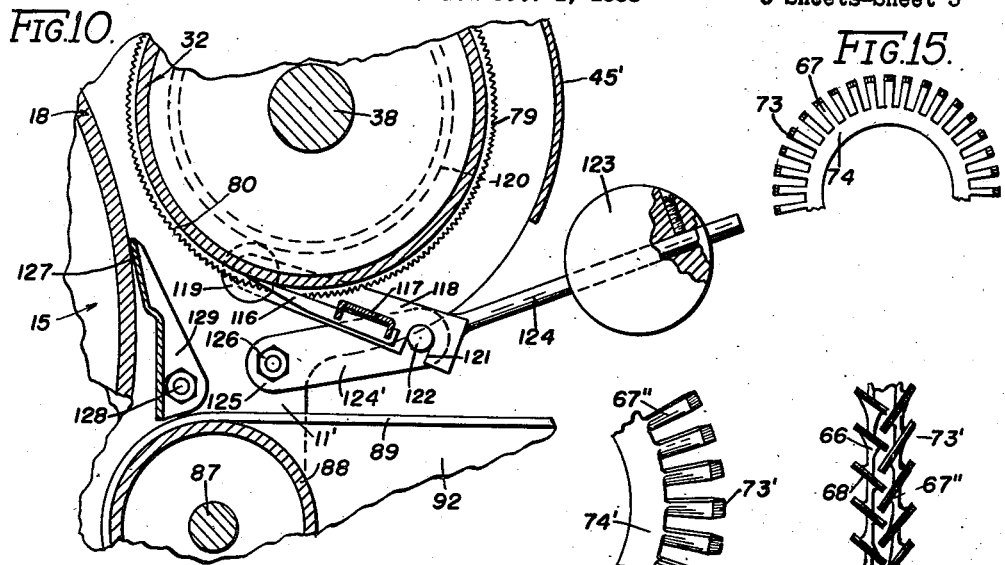
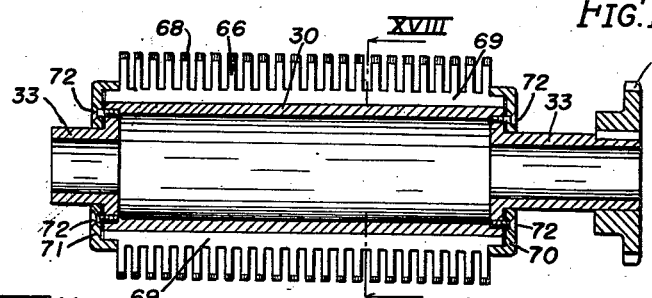
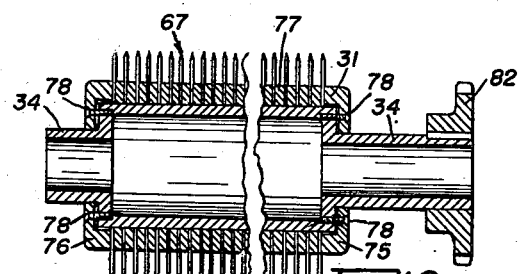
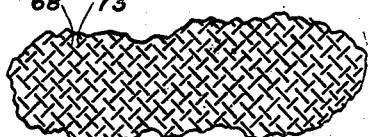
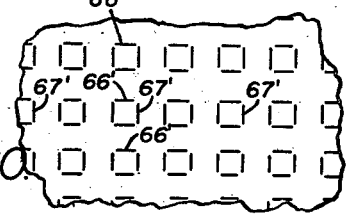
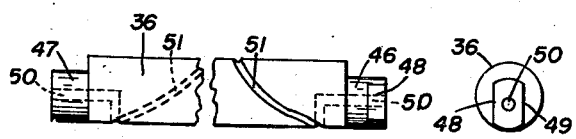
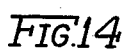
INVENTORS.
CHARLES DOERING.
HENRY H. DOERING.
BERT J. SKOGLUND.
ERIC W. ANDERSON.
BY
ATTORNEY.

Patented Feb. 2, 1943

2,310,067

UNITED STATES PATENT OFFICE 2,310,067

MEAT REFORMING AND ROLLING MACHINE

Charles Doering, Henry H. Doering, Bert J. Skoglund, and Eric W. Anderson, Chicago, Ill.; said Skoglund and said Anderson assignors to said Charles Doering and said Henry H. Doering Application October 1, 1938, Serial No. 232,740

12 Claims. (Cl. 17—26)

This invention relates to edible substance processing devices and more particularly to instrumentalities for providing multiplicity of cuts, slits or scores in preformed self-sustaining and form-retaining edibles such as sliced meats to effect their reformation and conversion into a soft mass having improved eating and taste qualities.

It contemplates more especially the provision of a continuously operating machine for feeding edible preformed substances along a predetermined path for interrupting the body thereof by a multiplicity of cuts, slits or scores in order to sever or weaken the fibers existent in the body thereof and reform the body into a soft, tender and readily foldable mass.

Numerous types of meat treating machines have heretofore been proposed and it is the primary purposes of this invention to improve machines of this type with a view of facilitating the treatment and reformation of meats into a soft, tender and flexible mass in a continuity of operations without entailing appreciable time or labor.

One object of the present invention is to simplify the construction and improve the operation of devices of the character mentioned.

Another object is to provide improved means for continuously interrupting the surfaces of preformed self-sustaining and form-retaining edible substances such as sliced meats to cut, sever or impair the tough fibers existent therein and effecting the reformation thereof for the purpose of converting such into a more edible, tasty, and tender mass without disintegration.

Still another object is to provide improved means for cooperating with each other for effecting the traverse of edible substances along a predetermined path in a continuity of operations for imparting a multiplicity of cuts, scores, or fiber severances therein to effect the reformation thereof without disintegration.

A further object is to provide a meat processing device having improved end piercing and compressing means for cooperating with the relatively moving surfaces to reform substances traversing therebetween.

A still further object is to provide a meat treating device with improved rollers having end piercing and reforming means for cooperating with the relatively moving surfaces to interrupt the body of substances traversing therebetween.

Still a further object is to provide a self-contained device with rollers having varied end piercing and compressing means for cooperating with a rigid support and feeding surface moving relatively thereto for interrupting the body and effecting the severance of the fibers therein for conversion into a reformed and more readily edible substance mass without disintegration into component parts.

Other objects and advantages will appear from the following description of an illustrative embodiment of the present invention.

In the drawings:

Figure 4 is a fragmentary sectional view taken substantially along line IV—IV of Figure 2.

Figure 5 is a fragmentary enlarged sectional view of the severing mechanism taken substantially along line V—V of Figure 2.

Figure 6 is an enlarged fragmentary side view in elevation of the adjustable means for the kneading or compressing instrumentalities shown and taken substantially along line VI—VI of Figure 2.

Figure 7 is an enlarged fragmentary sectional view of the operating plate taken substantially along line VII—VII of Figure 1.

Figure 8 is a fragmentary enlarged sectional view of the supporting mechanism taken substantially along line VIII—VIII of Figure 1.

Figure 9 is a fragmentary sectional view of the cutting roller and auxiliary shoulder taken substantially along line IX—IX of Figure 2.

Figure 10 is a fragmentary enlarged sectional view of the cutting roller taken substantially along line X—X of Figure 9.

Figure 11 is an enlarged sectional view of the roller having end piercing means taken substantially along line XI—XI of Figure 2.

Figure 12 is a fragmentary enlarged sectional view of a roller having end piercing means taken substantially along line XII—XII of Figure 2.

Figure 13 is a fragmentary enlarged front view in elevation of an eccentric mounting shaft for the rollers shown in Figures 11 and 12 to effect the adjustable support thereof relative to the feeding means.

Figure 14 is an end view of the eccentric mounting shaft shown in Figure 13.

Figure 15 is a fragmentary side view in elevation of an individual disc having end piercing means mounted thereon.

Figure 16 is a fragmentary enlarged side view of an end piercing blade of modified shape.

Figure 17 is a fragmentary end view of a modified end piercing blade unit shown in Figure 16.

Figure 18 is a sectional view in elevation taken substantially along line XVIII—XVIII of Figure 11.

Figure 19 is an enlarged plan veiw of the surface of an edible substance treated with end piercing blades of the type shown in Figure 17.

Figure 20 is an enlarged plan view of the surface of an edible substance treated with end piercing blades of the type sequentially shown in Figures 11 and 12.

Figure 1:
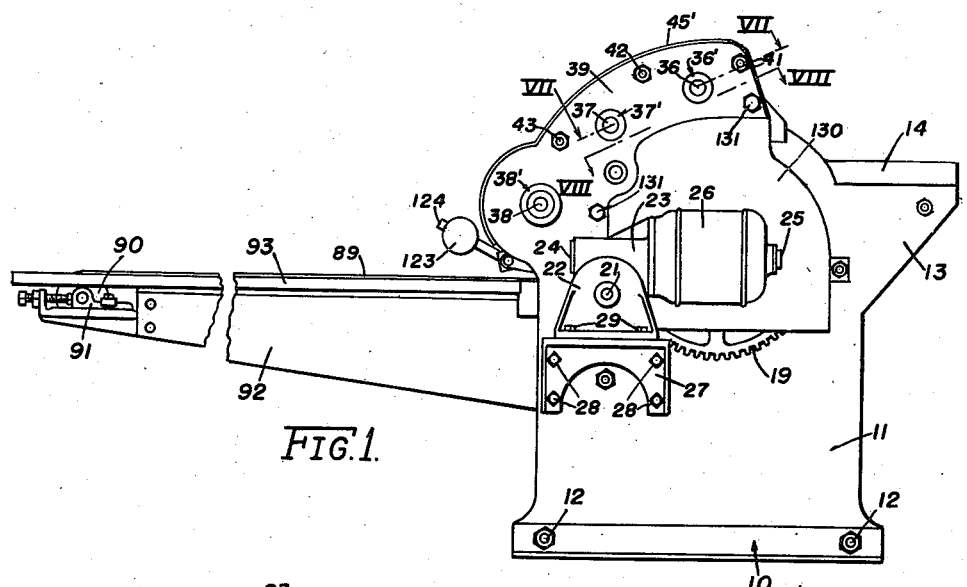
Figure 1 is a side view in elevation of a device embodying features of the present invention, the electric motor casing being removed to clarify the showing.

The structure selected for illustration comprises a base 10 which supports a frame having spaced upstanding side walls 11 and 11' serving as a support for instrumentalities to be hereinafter described. The upstanding frame sides 11 and 11' are suitably fastened to the base 10 in any suitable manner, in this instance with the threaded bolts 12. As shown, the upstanding sides 11 and 11' have an inclined extension 13 serving to support a horizontal platform 14 disposed at convenient arm heighth of an attendant or operator. The base 10 and upstanding sides 11—11' together with the inclined extension 13 and the horizontal support 14 may be cast, stamped or otherwise shaped to constitute a rigid and durable instrumentality support to facilitate the treatment of substances having a preformed body or constituting a mass that is self-sustaining and form-retaining to effect their conversion into a more tender and reformed mass without occasioning the disintegration thereof.

In order to feed the self-sustaining and form-retaining edible substance such as sliced meat along a predetermined path, an enlarged cylindrical roller 15 has a shaft 16 journalled in hubs 17 disposed axially through the ends of the roller 15 whose peripheral surface 18 is preferably though not essentially of stainless steel or other non-corroding sheet material. The shaft 16 is journalled in bearings provided in the upstanding frame wall 11 so as to afford the mounting of a large spur gear 19 thereto. The spur gear 19 meshes with a comparatively small pinion 20 that is fixed for rotation to the extremity of a shaft 21 journalled in a speed reducer housing 22. The speed reducer housing 22 constitutes part of an armature shaft housing 23 which rotatively supports a shaft 24 operatively connected to an armature shaft 25 constituting a part of an electric motor 26.

Figure 3:
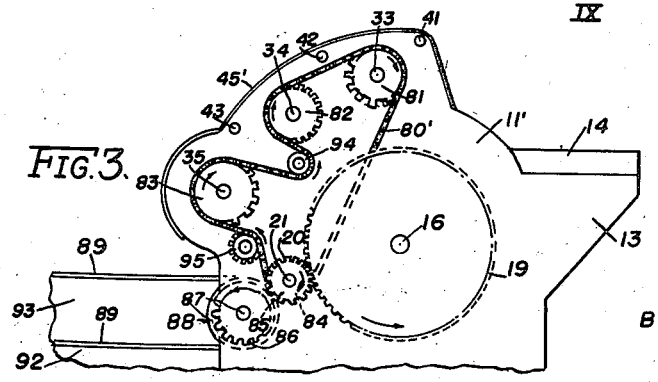
Figure 3 is a fragmentary schematic side view of the power driven instrumentalities shown in Figure 1 to illustrate the layout of the gears, sprockets, and chain.

The speed reducer housing 22 is secured to a bracket 27 attached as at 28 for support by the frame wall 11 of the base supported frame constituting a part thereof. Suitable fasteners such as studs 29 effect attachment to the speed reducer housing 22 together with the shaft housing 23 and electric motor 26 to effect their support upon the bracket 27. It will be apparent, therefore, that the electric motor 26 imparts rotation to the peripheral surface 18 of the feeding roller 15 in close proximity to the horizontal platform 14 of the frame wall 11, thereby affording the displacement of edible substances such as sliced meat thereon for effecting the traverse thereof along a predetermined path. To this end, the cylindrical roller 15 rotates in a counterclockwise direction (viewed from Figures 1 and 3) so as to carry the preformed edible substance from the frame platform 14 to instrumentalities that cooperate with the peripheral roller surface 18.

To the end of converting the preformed edible substance such as sliced meat into a more tender and reformed mass without effecting the disintegration thereof into segments in a continuity of operation, a plurality of rollers are mounted to cooperate with the peripheral surface 18 of the feeding roller 15. A plurality of cooperating rollers 30, 31, and 32, in this instance three, are provided with axially aligned tubular hubs 33, 34 and 35, respectively. The tubular hubs 33, 34, and 35 of the rollers 30, 31 and 32 receive shafts 36 and 37 therethrough that are journalled in bushings 36', 37', and 38' mounted in the frame wall 11 and in bushings 36', 37', and 38 in a confronting side plate 39 which is bolted to and spaced from the other frame wall 11' (Figure 2) to constitute a spaced lateral extension thereof. The adjacent frame wall 11' is slotted as at 40 (Figure 5) to freely accommodate the roller shafts 36 and 37 for suspension between the opposite frame wall 11 and the lateral spaced extension 39.

A plurality of frame bolts 41, 42 and 43, in this instance three, extend between the confronting frame walls 11—11' to maintain them in rigid spaced relation as well as to afford the mounting of a perforated guard 45 together with a solid cover 45' to particularly protect the attendant from the rollers 30, 31 and 32 which are provided with very dangerous end piercing blades and serrated surfaces as will appear more fully hereinafter. The solid cover 45' may be removed and the attendant can view and supervise the operation of the machine through the perforated guard 45 and still insure the required protection against injury.

This guard 45 is particularly advantageous when new runs of sliced meats are being started through the machine to insure the correct adjustment of the respective rollers in procuring the most effective results. After adjustment has been made for any particular sliced edibles which may vary in thickness, the solid cover 45' can then be replaced to insure utmost sanitation as well as safety. It will be observed that the side plate 39 which is spaced from the frame wall 11' and confronts therewith to cooperate with the opposite wall 11 in supporting the instrumentalities such as the shafts 36, 37, 38, together with their rollers 30, 31 and 32, respectively.

To this end, the frame bolts 41, 42 and 43 are provided with extensions 44 that project through and effect the spaced support of the plate 39 for rigid attachment to and support by the frame walls 11—11'. It will be observed that the supporting rollers 30, 31 and 32 through their shafts 36, 37 and 38 respectively, are journalled in and supported by the spaced plates 11—39, these being disposed in an arcuate line (Figure 4) conforming substantially with the curvature of the peripheral surface 18 of the feed roller 15.

It will be observed that the shafts 36, 37 and 38 are provided with eccentrically disposed extremities 46 and 47 to afford the adjustment of the rollers 30, 31 and 32 relative to the feeding surface 18 of the roller 15. To this end, one extremity 46 of each shaft 36, 37 and 38 is provided with milled flats 48—49 (Figs. 13 and 14) to afford the rotary adjustment of the shafts 36, 37 and 38 by imparting partial rotation thereto in bringing the rollers 30, 31 and 32 closer to or further away from the cooperating peripheral feeding surface 18. Suitable lubricating apertures 50 are provided in the shafts 36, 37, and 38 to communicate with helical grooves 51 provided in the surface thereof, thereby affording lubrication of the interior coacting elements from the exterior of the shafts 36, 37, and 38.

The shaft 38 is preferably though not essentially provided with axial bores 52 and 53 to communicate with the surfaces thereof through ports 54 and 55 that extend into the interior of the roller 32 so that any suitable tempering fluid such as water or a refrigerant may be circulated therethrough from sources 56 and 57 having a mixing, expansion or control valve 58 operatively connected therewith. This serves to refrigerate the meat or at least reduce the temperature thereof for preservation and improved handling simultaneous with the discharge thereof. A thermometer or temperature indicator 59 may be provided in the line 60 which directs the refrigerant or tempering fluid from the sources 56—57 through and around the interior of the roller 32 and out through the axial bore 53 that has a hose connection 61 to provide for the discharge or re-circulation of the refrigerant or tempering fluid.

This same temperature control may be provided on the other rollers 30 and 31 should commercial practice so dictate. It will be observed that while the shafts 36 and 37 are adjustable by applying a wrench to the milled flats 48—49 on one extremity 46 thereof, the shaft 38 is provided with a lever 62 fitted to its milled extremity 46 to facilitate rotary adjustment by manipulating a handle 63 fixed to the end of the lever 62. A spring-impelled detent 64 on the handle 63, cooperates with a series of apertures 65 concentrically spaced along the circular path of the handle detent 64 which is displaceable so that the position of the roller 32 can be accurately maintained and readily adjusted as such will vary depending upon the thickness of the substances that are directed along the feeding roller 15 and the extent to which the mass is to be compressed or kneaded.

The respective positions of the rollers 30 and 31 are maintained constant after once being adjusted. The serrated surfaces of these rollers should approach the peripheral feeding surface 18 sufficiently close to almost establish direct contact therewith, since the clearance is so minute therebetween to merely preclude wear thereon. Each of the rollers 30 and 31 have, in this instance, end piercing blades preferably though not essentially consisting of circumferential rows of blades 66 and 67 provided, respectively, on the rollers 30—31. The roller 30 has substantially flat blades 66 terminating in sharp tapered or ground end piercing edges 68 that are disposed in longitudinal alignment with the axis of the roller 30 so as to impart straight transverse piercing slits, cuts or scores 66 (Figure 20) to the edible bodies that traverse thereon with the feeding surface 18 serving as a support therefor.

The blades 66 are uniformly spaced from each other and constitute a part of rectangular plates 69 that are detachably associated with the periphery of the roller 30 by means of end hubs 70 and 71 secured thereto in any suitable manner. The end hubs 70 and 71 are secured by means of threaded studs 72 which project through the end hubs 70—71 to engage the end surfaces of the roller 30, thereby holding the concentrically spaced plates 69 with their transverse rows of blades 68 in the desired spaced relation. The blades 67 on the roller 31 are, in this instance, disposed in a direction normal to the blades 66 to impart spaced and interrupted end impressions, scores or cuts 67' (Figure 20) in the body of the edible substances that are longitudinal to the feeding direction thereof along the roller 15.

It will be observed that the blades 67 have sharp end piercing extremities 73 (Figure 15), formed on discs 74 longitudinally spaced along the axis of the roller 31 and detachably associated therewith by means of the end hubs 75 and 76 that cooperate with spacer rings 77 to maintain the individual blades 67 in transverse spaced relation. This attachment is effected by means of threaded studs 78 that extend through the end hubs 75—76 to engage the end surfaces of the roller 31. It will be observed that the longitudinal spacing of the blades 67 along the axis of the roller 31 is somewhat greater than the transverse spacing of the blades 66 on the periphery of the roller 30 so that the end piercing engagement thereof on edible substances such as sliced meats will impart interrupted scores or slits 66'—67' that provide an interrupted surface and penetrate the body thereof to destroy, sever or weaken the fibers therein without disintegrating the body of the substance to eliminate the toughness therein.

Because the blades 66 and 67 extend to and all but touch the peripheral surface 18 of the roller 15, end piercing of the substance is effected throughout the thickness of the body passing therebetween so as to tenderize and deprive such of its self-sustaining and form-retaining characteristics without disintegration into a comminuted state. This takes place in that the rollers 31 and 32 rotate in a direction opposite to the feeding roller 15 and in unison therewith so that the edible substances pass therebetween along a predetermined path to be processed and made more tender and reformed into a non-rigid rollable and easily foldable compact unit or package.

After the edible mass is subjected to the end piercing blades 66—67 on the rollers 30 and 31, it passes to a kneading or compressing roller 32 having a serrated peripheral surface 79 in the form of short teeth which impart any desired degree of reforming thereto by compression to any desired extent. It will be observed that the serrated peripheral edge surface 79 is provided with circumferentially spaced grooves 80 to permit strippers to pass therein for removing the edible substances therefrom as will appear more fully hereinafter. This kneading and compressing action enables the combination of other edible food particles such as comminuted bacon, suet, chicken meats, and similar trimmings with the initially self-sustaining and form-retaining processed mass that can be folded therewith into a composite roll or compact unit.

It will be observed, however, that the degree of kneading or compressing that is imparted to the edible substances depends upon the position of the lever 62 with its handle 63 having its detent 64 positioned in any one of the apertures 65 in the frame side wall 11. This can be varied almost instantaneously, depending upon the thickness of the edible substance such as sliced meats that are displaced along a predetermined path between the feeding surface 18 and the end piercing blades 66—67 and serrated surface 79. Rotation of the rollers 30, 31 and 32 in a direction opposite to the peripheral surface 18 and at substantially the same linear speed therewith is effected by means of an endless sprocket chain 80' that meshes with sprockets 81, 82, and 83, fixed to the tubular hubs 33, 34 and 35, respectively (Figures 3, 9, 11 and 12).

The chain 80' also engages a sprocket 84 mounted on the speed reducer shaft 21 that carries the pinion 20 in meshing engagement with the spur gear 19 which drives the feeding roller 15. The shaft 21 also has a pinion 85 that meshes with the gear 86 carried by a shaft 87 to which is mounted a pulley 88 for conveying an endless belt 89 disposed beneath the kneading roller 32 to convey the tender and reformed substance therefrom. The endless conveyor belt 89 cooperates with a pulley 90 journalled in an adjustable bracket 91 that is carried by a beam 92 extending from the frame walls 11—11' to support a table 93 between the upper and lower travel horizontal portions of the endless belt 89.

It will be observed that idler sprockets 94 and 95 are interposed between the sprockets 82—83 and 83—84 so as to define the path of the sprocket chain 80' that meshes for a sufficient number of teeth on the sprockets 82, 83 and 84 to properly drive the rollers 30, 31 and 32 with minimum wear and at the same linear speed and in a rotary direction opposite to the feeding roller 15 responsive to the operation of the electric motor 26. It will be observed that in the modified end piercing blade members disclosed in Figure 17, the blade ends 68' and 73' are disposed angularly to each other and substantially in a direction normal to their ground surface edges so that adjacent rows of blades 66''—67'' on the same roller would impart cuts in the body of the substances substantially as illustrated in Figure 19, and this can be in addition to the normally related and rectangularly arranged cuts 66' and 67' (Figure 20) effected by the rollers 30—31 or as a substitute therefor, depending upon the dictates of commercial practice and the particular type of edible substances that are to be reformed.

Especially tough substances such as the poorer cuts of sliced meats could instantaneously be reformed with the expedients described in the preferred embodiment in addition to those illustrated and described in connection with Figures 17 and 19; however, this depends largely upon the requirements of commercial practice, the initial toughness of the meats, and the thickness of the edibles to be reformed and the extent to which the body thereof is to be interrupted for any particular purpose.

In order to remove the substances from the end piercing blades 66—67 and the serrated surface 79, a series of strippers are mounted relative thereto. In this instance, a double set of strippers are disposed in confronting relation with the rollers 30 and 31, these consisting of spaced finger ejector arcuate plates 96 and 97 that are alternately disposed relative to each other (Figure 8). The outside extremities of the ejector plates 96 and 97 are anchored in end rods 98 and 99, respectively. The inward extremities of the arcuate ejector plates 96—97 are anchored to an intermediate rod 100 to constitute a detachable stripper for both the rollers 30 and 31.

To this end, they are spring suspended so that the ejector plates 96—97 are disposed between each row of blades 66—67 in a position between their roller shafts 36—37 and the peripheral feeding surface 18. The rods 98, 99 and 100 are interconnected by side plates 101 that maintain them in rigid spaced relation, these being provided with slots 102 and 103 to receive threaded studs 104—105 therethrough for connection by means of correspondingly threaded screw members 106—107 in threaded engagement therewith to operate springs 108—109 that envelop the threaded studs 104—105.

The threaded studs 104—105 are mounted in brackets 110—111 which are secured by means of threaded stud fasteners 112 and 113 to the frame side walls 11—11'. Adjusting screw members 112' and 113' laterally engage the side members 101 to enable the transverse adjustment of the strippers 96—97 as a unit. Screw driver engaging slots 114 and 115 are provided in the ends of the screw members 106—107 so as to render the arcuate stripper plates 96—97 conveniently adjustable in a vertical direction relative to the blades 66 and 67 on the rollers 30 and 31. It will be observed, therefore, that the strippers 96—97 will effectively reject and remove the edible substances from the blades 66—67 after being pierced therewith and permit the traverse thereof from one roller to the next roller 31, and then to the compressing roller 32 having a serrated peripheral surface 79 thereon.

Straight and sharp stripper blades 116 (Figure 10) are also provided for the compressing roller 32 for disposition in the circumferential grooves 80 thereof. The stripper blades 116 are, in this instance, mounted in a transverse bar 117 that is carried by confronting side plates 118. The side plates 118 support end rollers 119 at their extremities to cooperate with peripheral flanges 120 provided in the end surface of the roller 32 (Figure 9). The other extremities of the side plates 118 are notched as at 121 to receive pins 122 therein about which the side plates 118 pivot responsive to the gravity urge of weights 123 adjustably carried by rods 124 angularly fixed to the side plates 118.

The pins 122 that cooperate with the notches 121 in the side plates 120 are carried by links 124' anchored at one extremity 125 thereof to the frame side walls 11—11' by means of bolts 126. It will be apparent, therefore, that the strippers 116 together with their bar 117 and the weights 123 can be removed as a unit for cleaning purposes. When in operative position, however, the points of the stripper or ejector plates 116 contact the correspondingly spaced grooves 80 in the serrated peripheral surface 79 of the roller 32 responsive to the clockwise urge of the weights 123 (viewed from Figure 10). The edible substances are precluded from adhering to the peripheral surface 18 of the feeding drum 15 by means of a scraper 127 that is in contact therewith proximate to the endless conveyor belt 89 (Figure 10) for pivotal mounting on bolts 128 projecting through the lateral scraper flanges 129 formed thereon.

Figure 2:
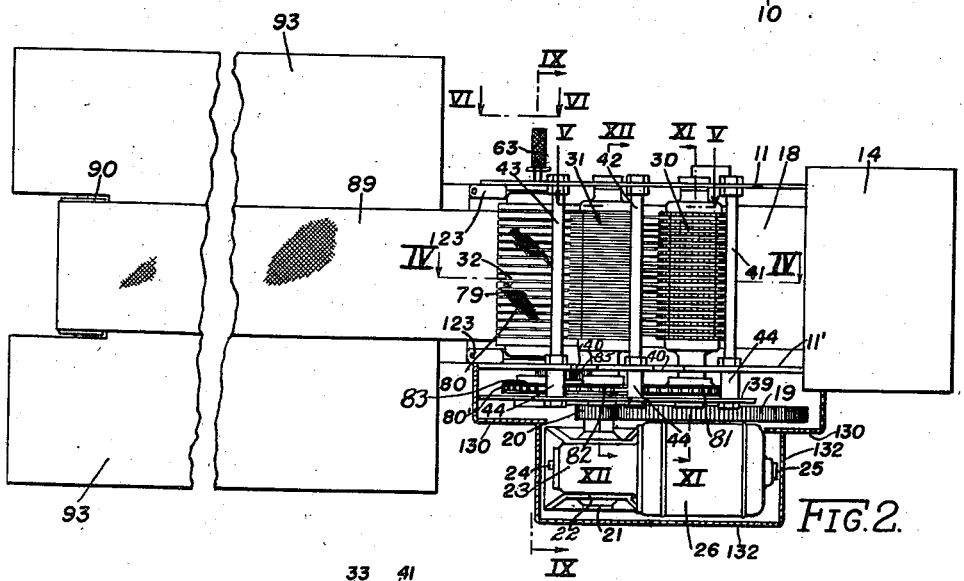
Figure 2 is a plan view of the device shown in Figure 1 with the electric motor casing and rear guard shown in section to clarify the showing.

In consequence thereof, the scraper blade 127 that extends across the peripheral surface 18 of the feeding roller 15, can be adjusted through the medium of the mounting bolts 128 to assume the desired and effective scraping position relative to the peripheral feeding surface 18 to discharge the treated substances to the endless belt 89 that passes along the table 93 for manual wrapping and packing in containers by attendants. A sheet metal cover 130 is suspended from the extension plate 39 by means of bolts 131 to serve as a safety guard over the spur gear 19 (Figures 1 and 2). Another cover 132 is pivotally attached to the gear guard 130 (Figure 2) to project therefrom and enclose the speed reducer 22 together with the electric motor 26 and their mounting bracket 27.

It will be observed that edible substances such as sliced meat can be placed on the horizontal platform 14 and displaced by the attendant to the feeding roller surface 18 for end piercing by the blades 66—67 with or as a substitute for the blades 66″—67″ to sever, interrupt, or weaken the fibers therein without effecting the disintegration of the edible mass. Thereupon, the substances pass underneath the kneading roller 32 that effects the compression thereof to the desired density and form depending upon the position thereof as determined by the control lever 62 held in position by the handle 63 and detent 64 cooperating with apertures 65. This is accomplished in a continuity of operations without entailing any appreciable time or labor. Edible substances are reformed into a tender mass which can be suitably rolled or folded into a compact unit for convenient wrapping in preparation for the market. Other edibles such as comminuted bacon, suet and various meat trimmings may be compressed in the sliced meats by the kneading roller 32 to define an edible composite substance that can be rolled and folded to assume a country roll shape.

The bacon, suet, meat trimmings, or other edible filling with or without seasoning may be distributed over a flat slice of meat or a portion thereof such as a flank steak or other cuts of meat, and then folded once-over to confine any selected edible filling therebetween. The folded meat is then passed between the feeding surface 18 and rollers 30, 31, and 32 for subjection thereto and reformation into composite unitary products having the appearance of a laminated substance. The edible filling not only is comminuted, but also becomes embedded in the body of the meat and more particularly into the cuts, slits or interruptions provided therein and then compressed by the roller 32 so that the composite substance can be reduced to the desired thickness and shape possessed of sufficient flexibility to be rolled or otherwise arranged into compact tender units.

The treated edible substances are then ready to be wrapped in bacon skins, Cellophane, ham skins, glassine, transparent wrappers or other sanitary packaging materials or hermetically sealed in cans, jars or small glass containers in readiness for the market and eventual preparation in the home. When enclosed in bacon and ham skins, the confined edible substances gradually extract or absorb the tasty and vitamin juices therefrom. This combined treatment appreciably improves the texture and taste characteristics of such edibles as well as enhances the market value thereof. Then, too, edibles such as meats otherwise too tough or trimmings ordinarily considered waste products, can be utilized to good advantage and placed upon the market in a very palatable form after being treated with instrumentalities and the manner described herein.

Various changes may be made in the embodiment of the invention herein specifically described without departing from the invention or sacrificing any of the advantages or features thereof, and nothing herein shall be construed as limitations upon the invention, its concept or structural embodiment as to the whole or any part thereof except as defined in the appended claims.

We claim:

1. In a processing machine of the character mentioned, the combination with cylindrical drum means having a smooth surface for feeding substances along a predetermined path, of a plurality of rotary means in said path, end piercing blades extending radially from said rotary means to confront said smooth surface feeding means with the substances therebetween, and means for effecting relative movement between said feeding and rotary means.

2. In a processing machine of the character mentioned, the combination with a cylindrical drum having a smooth uninterrupted surface for feeding substances along a predetermined path, of a plurality of rotary means in said path, end piercing blades extending radially from said rotary means, the blades on said rotary means being disposed relatively to each other to confront said cylindrical smooth surface feeding means with the substances therebetween, and means for effecting relative movement between said feeding and rotary means.

3. In a processing machine of the character mentioned, the combination with a cylindrical drum having a smooth uninterrupted surface for feeding substances along a predetermined path, of a plurality of rotary means in said path, end piercing blades extending radially from said rotary means, the blades on said rotary means being disposed relatively to each other to confront said cylindrical smooth surface feeding means with the substances therebetween, means for effecting relative movement between said feeding and rotary means, and stripping means associated with said rotary means.

4. In a processing machine of the character mentioned, the combination with solid uninterrupted surface means for feeding substances along a predetermined arcuate path, of a plurality of rotary means mounted along a correspondingly arcuate line parallel to said arcuate feeding path, end piercing blades extending radially from said rotary means to confront said solid uninterrupted surface feeding means with the substances therebetween, means for effecting relative movement between said feeding and rotary means, and means for adjusting said rotary means relative to said feeding means.

5. In a processing machine of the character mentioned, the combination with rotary cylindrical means for feeding substances along a predetermined path, of a plurality of rotary means in said path, end piercing blades extending radially from said rotary means, the blades on said rotary means being disposed relatively to each other to confront said cylindrical feeding means with the substances therebetween, means for effecting relative movement between said feeding and rotary means, means for adjusting said rotary means relative to said feeding means, stripping means associated with said rotary means, and means for adjusting said stripping means relative to said rotary means.

6. In a processing machine of the character mentioned, the combination with cylindrical means having a smooth solid surface for feeding substances along a predetermined path, of a plurality of rotary means in said path, end piercing blades extending radially from said rotary means, the blades on said rotary means being disposed relatively to each other to confront said solid surface feeding means with the substances therebetween, means for effecting relative movement between said feeding and rotary means, means for adjusting said rotary means relative to said feeding means, stripping means associated with said rotary means, means for adjusting said stripping means relative to said rotary means, and kneading means cooperating with said feeding means for densifying the interrupted mass of substance after being discharged from said blade means.

7. In a processing machine of the character mentioned, the combination with a smooth surfaced cylindrical means for feeding substances along a predetermined path, of a plurality of rotary means in said path, end piercing blades extending radially from said rotary means, the blades on said rotary means being disposed relatively to each other to confront said smooth surfaced feeding means with the substances therebetween, means for effecting relative movement between said feeding and rotary means, means for adjusting said rotary means relative to said feeding means, stripping means associated with said rotary means, means for adjusting said stripping means relative to said rotary means, and rotary kneading means cooperating with said feeding means for densifying the interrupted mass of substance after being discharged from said blade means.

8. In a processing machine of the character mentioned, the combination with cylindrical means for feeding substances along a predetermined path, of a plurality of rotary means in said path, end piercing blades extending radially from said rotary means, the blades on said rotary means being disposed relatively to each other to confront said feeding means with the substances therebetween, means for effecting relative movement between said feeding and rotary means, means for adjusting said rotary means relative to said feeding means, stripping means associated with said rotary means, means for adjusting said stripping means relative to said rotary means, rotary kneading means cooperating with said feeding means for densifying the interrupted mass of substance after being discharged from said blade means, means for controlling the temperature of said kneading means, and means for conveying the substance mass from said rotary kneading means.

9. In a processing machine of the character mentioned, the combination with cylindrical means for feeding substances along a predetermined path, of a plurality of rotary means in said path, end piercing blades extending radially from said rotary means, the blades on said rotary means being disposed relative to each other to confront said feeding means with the substances therebetween, means for effecting relative movement between said feeding and rotary means, means for adjusting said rotary means relative to said feeding means, stripping means associated with said rotary means, eccentric shaft means for adjusting said stripping means relative to said rotary means, rotary kneading means cooperating with said feeding means for densifying the interrupted mass of substance after being discharged from said blade means, means for controlling the temperature of said kneading means, and means for conveying the substance mass from said rotary kneading means.

10. In a meat processing machine of the character mentioned, the combination with smooth surfaced cylindrical means for feeding substances along a predetermined path, of a plurality of spaced rows of rotary means in said path, cylindrical end piercing blades extending radially from said rotary means, the blades on said rotary means being disposed relatively to each other to confront said smooth surfaced feeding means with the substances therebetween, means for effecting relative movement between said feeding and rotary means, and stripping means disposed between said spaced rows of end piercing blades on said rotary means.

11. In a meat processing machine of the character mentioned, the combination with a smooth endless surface for feeding substances along a predetermined path, of a plurality of spaced rows of rotary means in said path, end piercing blades extending radially from said rotary means, the blades on said rotary means being disposed relatively to each other to confront said smooth feeding surface with the substances therebetween, means for effecting relative movement between said feeding and rotary means, and stripping means disposed between said spaced rows of end piercing blades of said rotary means.

12. In a meat processing machine of the character mentioned, the combination with smooth endless sustaining surface for feeding substances along a predetermined path, of a plurality of spaced rows of rotary means in said path, cylindrical end piercing blades extending radially from said rotary means, the blades on said rotary means being disposed relatively to each other to confront said feeding surface with the substances therebetween, means for effecting relative movement between said feeding and rotary means, stripping means disposed between said spaced rows of end piercing blades on said rotary means, and means for adjusting said cylindrical rotary blade means relative to said cylindrical feeding means.

CHARLES DOERING.
HENRY H. DOERING.
BERT J. SKOGLUND.
ERIC W. ANDERSON.